(12) United States Patent
Nikovski

(10) Patent No.: US 8,577,857 B2
(45) Date of Patent: Nov. 5, 2013

(54) METHOD FOR MATCHING ELEMENTS IN SCHEMAS OF DATABASES USING A BAYESIAN NETWORK

(75) Inventor: Daniel Nikolaev Nikovski, Brookline, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 358 days.

(21) Appl. No.: 13/077,017

(22) Filed: Mar. 31, 2011

(65) Prior Publication Data

US 2011/0178966 A1 Jul. 21, 2011

(51) Int. Cl.
*G06F 15/18* (2006.01)
(52) U.S. Cl.
USPC .......................................................... 707/705
(58) Field of Classification Search
None
See application file for complete search history.

(56) References Cited

PUBLICATIONS

Hong-Hai Do, Erhard Rahm, Matching large schemas: Approaches and evaluation, Information Systems, vol. 32, Issue 6, Sep. 2007, pp. 857-885.*

Jacob Berlin , Amihai Motro, Database Schema Matching Using Machine Learning with Feature Selection, Proceedings of the 14th International Conference on Advanced Information Systems Engineering, p. 452-466, May 27-31, 2002.*
Gyftodimos, Elias et al. "Hierarchical Bayesian Networks: An Approach to Classification and Learning for Structured Data", SETN 2004, LNAI 3025, pp. 291-300, 2004.*
Rahm E et al.: "A Survey of Approaches to Automatic Schema Matching," VLDB Journal, Springer Verlag, Berlin, DE, vol. 10, Nov. 21, 2001, pp. 334-350.

* cited by examiner

*Primary Examiner* — Claire X Wang
*Assistant Examiner* — Thomas A James
(74) *Attorney, Agent, or Firm* — Dirk Brinkman; Gene Vinokur

(57) ABSTRACT

A method matches elements in two schemas for two associated databases using automatic schema matching (ASM), wherein there is one schema for each database, wherein the elements define objects in the databases, and wherein the matching is performed on pairs of the elements by a combined matcher including a set of matchers. A Bayesian network (BN) is constructed for the set of matchers, and for each pair of elements the following steps are performing: obtaining an individual similarity value for each pair of the elements and each matcher, determining a likelihood ratio for each individual similarity value, performing belief updating on the BN using the likelihood ratios to obtain a final similarity value and corresponding probability, and outputting the final similarity value and the probability to indicate whether the pair of the elements match, or not.

13 Claims, 3 Drawing Sheets

METHOD FOR MATCHING ELEMENTS IN SCHEMAS OF DATABASES USING A BAYESIAN NETWORK

FIELD OF THE INVENTION

The field of the invention is generally related to databases management, and more particularly to matching database schemas to determine whether elements in the schemas refer to the same database object.

BACKGROUND OF THE INVENTION

A schema describes a database supported by a database management system (DBMS). For example in a relational database, the schema defines elements such as tables, fields, relationships, views, indexes, procedures, and functions. Schemas are generally stored in a dictionary. In essence, the elements of the schema define objects in the database.

When there are multiple databases, each database can have its own associated schema, which may be different from other schemas for other databases. In this case, elements in multiple different schemas can correspond to the same object. It is often necessary to discover and establish an explicit mapping between such elements for applications such as data migration when one database has to be merged with another database, or in virtual databases where a single interface is used to access the multiple databases, or in data analysis when the multiple databases are stored in a data warehouse with a single schema.

When given two schemas, an objective of an automatic schema matching (ASM) method is to indicate which pairs of elements from the two schemas are likely to match, and a similarity value of such a match. The ASM typically uses a matcher. Numerous different types of matchers are known. The ASM problem is usually very difficult, because database designers rarely provide full and unambiguous information about the elements in the schemas, and if any such information exists, it is not meant for the AMS. Rather, database designers usually select suitable words or abbreviations for the names of elements, so as to facilitate maintenance.

In such cases, a lexical analysis of the names of the elements is an important approach for ASM. A different type of information that might be useful for the ASM is the structure of the schemas. In many cases, schemas are not represented by a list of names of the elements, but rather, the elements are organized in a hierarchy. For example, a parent element "CustomerName" can have three child elements "First-Name", "MiddleInitial", and "FamilyName". Using such structural information is another technique for the ASM. Many more techniques are known. For example, when values of two database fields come from the same statistical distribution, e.g., over names, or numbers, this can serve as evidence that the corresponding elements in the schema match. Dictionaries, thesauri, and other auxiliary data sources have also been used for ASM purposes Due to the difficulty of the problem, no single matcher is known to perform best on all ASM tasks. This has led to the idea that multiple matchers of the types described above can be used in combination in a composite matcher. The purpose of the composite matcher is to combine the output of the individual matchers and provide a more accurate set of matching elements.

In most cases, the output of an individual matcher k for a pair of elements $S_1 \cdot E_i$, and $S_2 \cdot E_j$ is a similarity value $V_k$ in an interval [0, 1], where $V_k=0$ means no similarity at all, and $v_k=1$ an exact match. For a library of K different matchers, an objective is to determine a composite similarity value v that is a function of the individual similarity values $V_k$, k=1 to K.

Several methods for combining similarity values are known. Those methods are largely heuristic approaches to the fundamental problem of combining evidence from multiple sources. One method uses machine learning to estimate weighting coefficients $W_k$ such that the final similarity value v is a weighted average of the individual similarity measures $$v = \sum_{k=1}^{K} w_k v_k.$$

Another method extends the above approach with minimum and maximum operators: $v_{min}=\min_k w_k v_k$, and $v_{max}=\max_k w_k v_k$. Those methods for combining similarity values lead to a higher matching accuracy than that of the accuracy of the individual matchers.

When combining evidence from multiple sources as described above, the improper modeling of correlation and other forms of statistical dependence between variables in the problem domain can be a major cause for errors. For example, when two very similar matchers k and l are applied to the ASM problem, their similarity values $v_k$ and $v_l$ are highly correlated. When $v_k$ is large, then $v_l$ is also large, and vice versa.

For example, if the above weighted average of the two similarity values is used, then the same evidence is counted twice. In practice, this results in a phenomenon known as over-confidence. One of the matchers is almost redundant, and including the redundant matcher in the composition process can actually decrease the accuracy of the matching. This effect has been observed in other fields where statistical evidence has to be combined, such as medical diagnosis.

It is desired to correct this over-confidence problem when matching elements in schemas.

SUMMARY OF THE INVENTION

The embodiments of the invention provide a method for matching elements in two schemas for two associated databases using automatic schema matching (ASM), wherein there is one schema for each database, wherein the elements define objects in the databases, and wherein the matching is performed on pairs of the elements by a combined matcher including a set of matchers.

A Bayesian network (BN) is constructed for the set of matchers, and for each pair of elements the following steps are performing: obtaining an individual similarity value for each pair of the elements and each matcher, determining a likelihood ratio for each individual similarity value, performing belief updating on the BN using the likelihood ratios to obtain a final similarity value and corresponding probability, and outputting the final similarity value and the probability to indicate whether the pair of the elements match, or not.

DETAILED DESCRIPTION OF THE PREFERRED EMBODIMENT

The embodiments of the invention provide a method for matching elements in two schemas for two corresponding databases using automatic schema matching (ASM). The method uses a composite matcher that outputs a similarity value and probability that is based on belief reasoning in a Bayesian network. The BN is constructed from a set of matchers that constitute the composite matcher.

Representation

Figure 1:
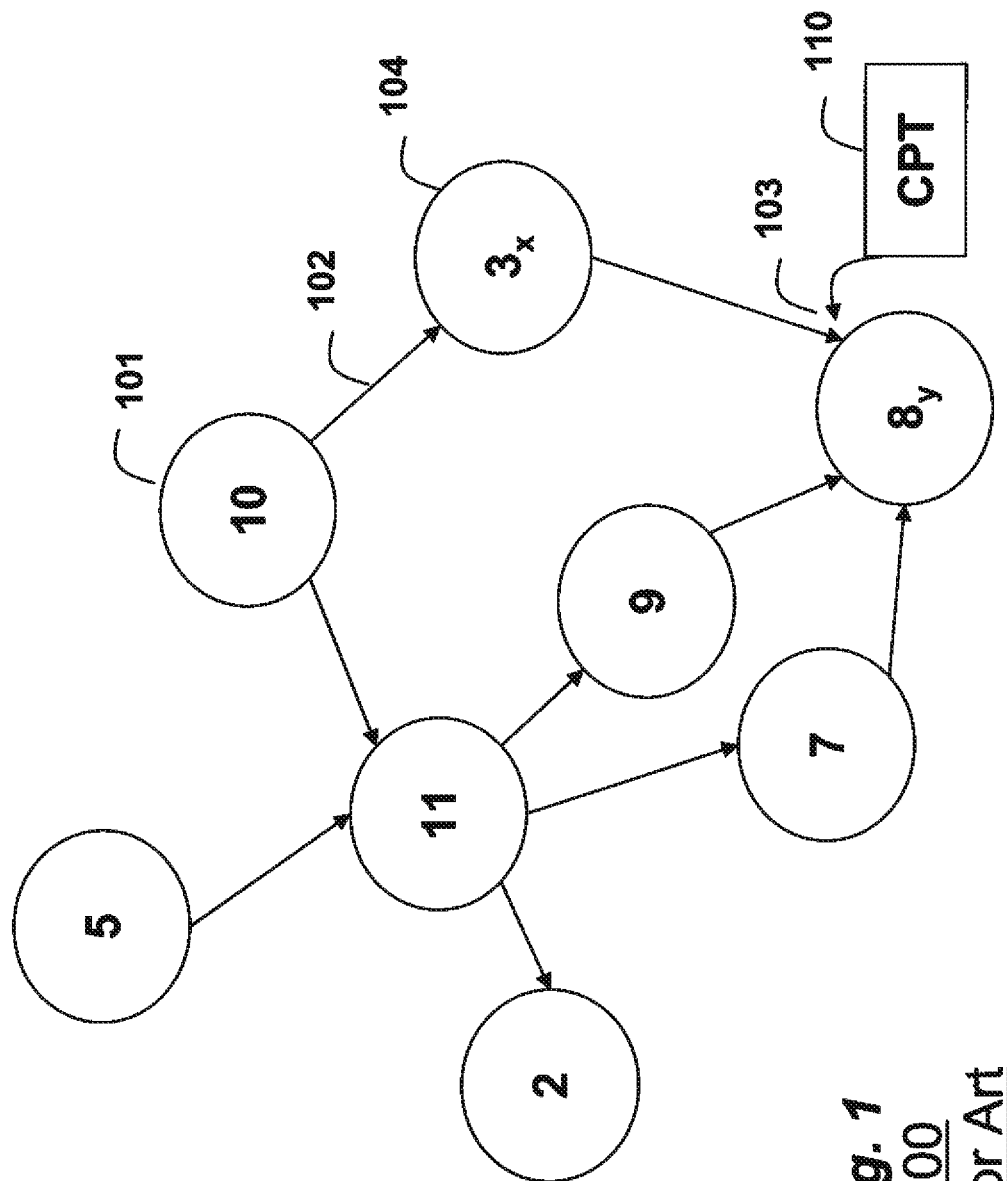
FIG. 1 is a schematic of a general conventional Bayesian network as known in the art.

A shown in FIG. 1, a general Bayesian network (BN), as known in the art, is a probabilistic model that represents a set of random variables and corresponding conditional dependencies by means of a directed acyclic graph (DAG) 100 of (ten) nodes 101 and directed edges 102 connecting the nodes. Each edge in the DAG between two nodes signifies that a variable Y corresponding to a child node 103 is statistically conditionally dependent on a variable X corresponding to the parent node.

This dependence can be expressed in a conditional probability table (CPT) stored in the child node for Y. If $X \in Par(Y)$, where $Par(X)$ is the set of parent nodes of node Y, the CPT contains probability entries $Pr(Y=y|Par(Y)=z)$ for every possible combination of values x that node X can take on and configurations (sets of values) z that the variables in $Par(X)$ can take on.

Likewise, when there is no direct edge between two nodes, the variables represented by the nodes are assumed to be conditionally independent, given their parents. In particular, when two nodes have a common parent, but no edge between the two nodes, the nodes are assumed to be conditionally independent given the value of their parent. The presence (or absence) of edges in the DAG representing the Bayesian network expresses the statistical dependence (correlation) between the variables.

Figure 2:
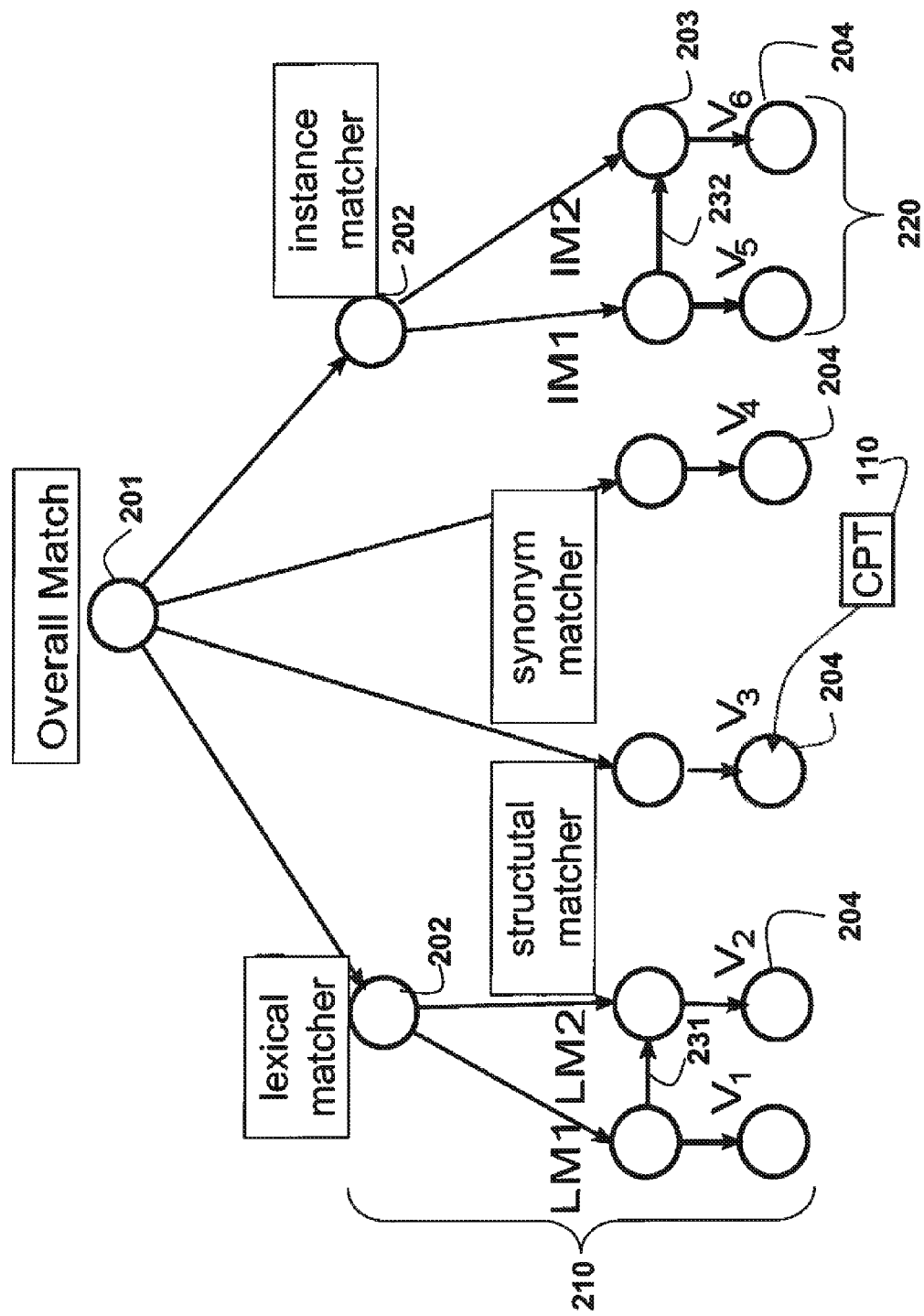
FIG. 2 is a schematic of an example Bayesian network according to embodiments of the invention.

FIG. 2 shows a specific example Bayesian network (BN) 200 representing a composite matcher constructed from a set of individual matchers according to embodiments of the invention. The BN combines outputs of individual matchers for the ASM task according to embodiments of the invention. Here, the DAG is a tree of depth four, with some additional edges between some of the nodes at the third level. The meaning of the nodes is as follows:

(1) At a first level, a root node 201 corresponds to a Boolean variable signifying an overall match between a pair of elements in two schemas. This is the final hypothesis that is evaluated, e.g., True or False;

(2) The nodes 202 at the second level of the tree correspond to Boolean variables representing similarity values for independent ways in which the pair of element can match, e.g., lexical, structural, instance-based, etc. It is expected that these variables are largely uncorrelated, because the variables use different information to test for possible matches. Each variable also correspond to clusters of individual matchers whose output is correlated. One cluster 210 represents the hypothesis that the two elements match lexically, and another cluster 220 represents the hypothesis that the instances (values) of the two elements in their respective databases match.

(3) The nodes 203 at the third level of the tree are also Boolean and represent the individual hypothesis that the two elements match, according to a single matcher corresponding to the respective parent nodes 202. The nodes include two lexical matchers LM1 and LM2, one structural matcher, one synonym matcher, and two instance matchers IM1 and IM2.

(4) The leave nodes $v_i$ 204 of the tree, at the fourth level, represent the similarity values $V_k$, $k=1$ to K of the individual matchers whose outputs have to be combined, where K=6 in this example. These variables are continuous and their possible values are the real numbers $V_k$.

The overall structure of the BN expresses an understanding when two elements match, or not. The outputs of the structural matcher, synonym matcher, the lexical match variable, and the instance match variable are statistically independent. This is expected, because these matchers all use different information from the two schemas to make an estimate whether the elements match, or not.

However, the outputs of the two lexical matchers $LM_1$ and $LM_2$ are correlated when they use the same information (the names of the two elements). This is also expected. Thus, there is an edge 231 between nodes LM1 and LM2. Similarly, the output of the two instance matchers ($IM_1$ and $IM_2$) are also correlated, because they both use the same information to obtain their estimates on, namely, the contents of the two corresponding database fields. Accordingly, the edge 232 between nodes IM1 and IM2 reflects this dependency. This structure of the BN indicates the matchers that produce highly correlated outputs, and the matchers that are statistically independent.

Parameter Estimation

If the BN is used for inference, the parameters in the CPTs 110 also have to be specified. This can be done by means of labeled cases, where pairs $e_i=(A_i, B_i)$ of elements $A_i$ and $B_i$, i=1 to N have been processed by all K matchers to produce the corresponding similarity values $v_{i,k}$, i=1 to N, k=1 to K, and the correct labeling for some or all of the remaining Boolean variables has been provided. If labels for all Boolean variables have been provided, then the estimation of the probabilities in the CPTs of the Boolean nodes can be reduced to frequency counting.

Frequency Counting

In frequency counting, an entry $Pr(Y=y|Par(Y)=z)$ is equal to a ratio of the number of cases when the node Y had a specific value y, either True or False, and the parents of node Y are in the configuration z, and the number of times the parents of node Y are in the configuration z, regardless of the value of the node Y.

For nodes with continuous values $V_k$, a suitable parametric model for the similarity values is selected. One possible model is a normal (Gaussian) distribution with a mean µ, and a variance $\sigma^2$. Then, two separate normal distributions $$N(\mu_{k,+}, \sigma_{k,+}^2) \text{ and } N(\mu_{k,-}, \sigma_{k,-}^2)$$

are estimated for positive (matching) cases, and negative (non-matching) cases on pairs of elements, respectively.

The mean $\mu_{k,+}$ is an average of the similarity values $V_{k,i}$ of all cases where the parent node $X_k$ of $V_k$ is labeled with the value True. The parameter $\sigma_{k,+i}$ is the sampled standard deviation of these cases. Analogously, the parameters $\mu_{k,-}$, and $\sigma_{k,-}$ are the sample mean and standard deviation of $V_{k,i}$ over all cases when the parent node $X_k$ is labeled with the value False.

It is also possible to estimate the parameters in the CPTs when only some of the nodes are labeled, as in the case where a user indicates whether the two elements match, i.e., the user has assigned a Boolean value to the root node of the BN, but an explanation why the elements match is not provided, e.g., whether the match is lexical, instance-based, structural, based on a dictionary. This situation is more challenging.

However, as long as the graph of the BN is known and fixed, it is still possible to estimate the most likely values of the parameters in the CPTs. This problem is known as parameter learning with partially observed data in BNs, and can be solved by means of a gradient ascent on a likelihood function, or an expectation maximization (EM) algorithm, among other methods.

Inference

Given the individual similarity values (204) $V_k = v_k$, k=1 to K, that have been determined by all individual matchers, the probability that the two elements match can be determined on the basis of all evidence, by means of a well known computational process known as belief updating.

Belief Updating

One possible method to perform belief updating is to construct a join tree of the Bayesian network, and use the joint tree for inference. Numerous tools are known in the art and are readily available to do this. The continuous variables $V_k$ 204, under the selected Gaussian parameterization, can be incorporated into the process of belief updating in the form of virtual (uncertain) evidence. To supply virtual evidence to the belief updating tool, all that is needed is the likelihood ratio (LR) of the observed similarity values $v_k$ for the similarity value variables $V_k$:

$$L(V_k = v_k \mid X_k) \doteq \frac{Pr(V_k = v_k \mid X_k = \text{True})}{Pr(V_k = v_k \mid X_k = \text{False})} = \frac{N(v_k \mid \mu_{k,+}, \sigma^2_{k,+})}{N(v_k \mid \mu_{k,-}, \sigma^2_{k,-})},$$

where $N(v|\mu, \sigma^2)$ is the probability that value v comes from a normal distribution with the mean $\mu$ and the variance $\sigma^2$, and $X_k$ is the parent node for the value $V_k$ in the BN. The belief updating can also be performed by variable elimination, or generalized belief propagation.

After the belief updating concludes, all Boolean nodes in the network are assigned probabilities according to the observed evidence (values) $v_k$ for the similarity value variables $V_k$. The probability of the root node is the final estimate that the two elements match, given the combined evidence of the individual matchers.

Figure 3:
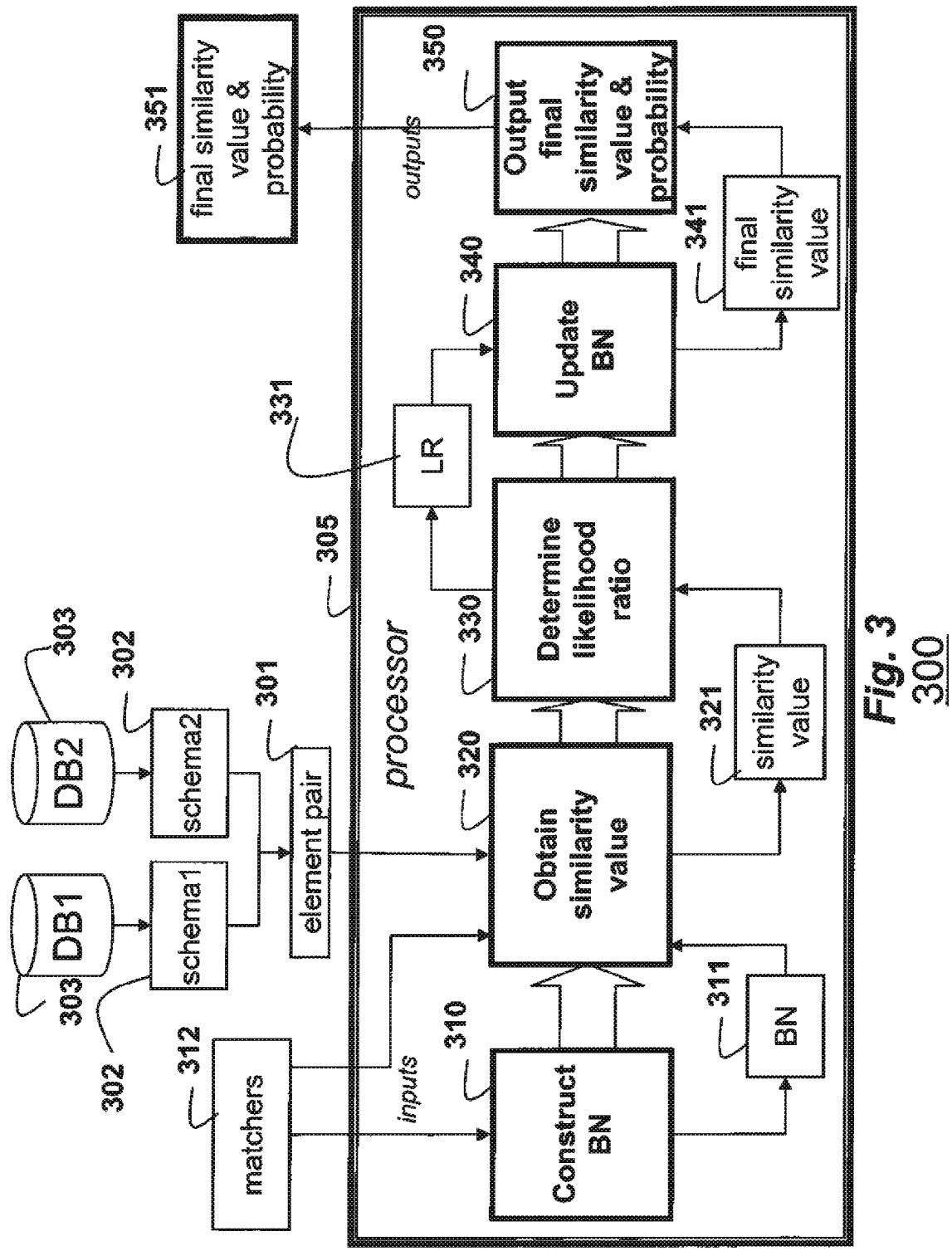
FIG. 3 is a flow diagram of a method for matching elements in schemas of databases according to embodiments of the invention.

FIG. 3 shows the basic steps of the above described method 300. The steps can be performed in a processor 305 connected to a memory and input/output interfaces as known.

The method matches all possible pairs 301 of elements in two schemas (schema2, schema2) 302 for a two associated databases (DB1, DB2) 303 using automatic schema matching (ASM). There is one schema for each database. The elements define objects in the databases. The matching is performed on the pairs of elements by a composite matcher including a set of matchers 312.

First, the method constructs 310 a Bayesian network 311 from the set of matchers 312.

Next, an individual similarity value 321 for each possible pair of elements 301 is obtained 320 for each matcher 312.

A likelihood ratio 331 is determined 330 for each individual similarity value.

Then, belief updating 340 is performed on the BN using the likelihood ratios 331 as virtual evidence. This produces a final similarity value and corresponding probability 341.

Last, the final similarity value and its probability is outputted 350 to indicate whether the pair of elements match, or not, and the expected confidence in that result.

In other words the method performed in the processor physically transform input pairs of elements in schemas of databases, and outputs a similarity score and probability that the elements in the pairs match, and likely pertain to the same object defined by the schemas.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for matching elements in two schemas for two associated databases using automatic schema matching (ASM), wherein there is one schema for each database, wherein the elements define objects in the databases, and wherein the matching is performed on pairs of the elements by a combined matcher including a set of matchers, comprising the steps of:

constructing a Bayesian network (BN) for the set of matchers, wherein parameters of the BN are estimated from fully labeled data, and wherein each Boolean variable has been labeled as True or False, and the parameter are estimated by means of frequency counting, and for each pair of elements performing the steps of:

obtaining an individual similarity value for each pair of the elements and each matcher;

determining a likelihood ratio for each individual similarity value;

performing belief updating on the BN using the likelihood ratios to obtain a final similarity value and corresponding probability; and outputting the final similarity value and the probability to indicate whether the pair of the elements match, or not.

2. The method of claim 1, further comprising:
merging the two databases according to the final similarity values and the probabilities.

3. The method of claim 1, further comprising:
accessing the two databases according to the final similarity values and the probabilities.

4. The method of claim 1, wherein the two databases are stored in a data warehouse with a single schema for the data warehouse.

5. The method of claim 1, wherein the BN is a tree of depth four, with additional edges between selected nodes at a third level, and at a first level, and further includes a root node corresponds to a Boolean variable signifying the final similarity value and the probability, intermediate nodes at the second level of the tree correspond to Boolean variables representing similarity values for independent ways in which the pair of element can match using each matchers, and the intermediate nodes at the third level represent individual hypothesis that the pair of elements match, according to a single matcher corresponding to a respective parent nodes at the second level, and leaf nodes at a fourth level represent the similarity values that continuous having possible values that are real numbers.

6. The method of claim 1, storing a conditional probability table with child nodes.

7. The method of claim 1, wherein the probability is in a form of a normal distribution with a mean and variance.

8. The method of claim 1, wherein the belief updating uses a join tree of the BN for inference.

9. The method of claim 1, wherein parameters of the BN are estimated from partially labeled data, where only a True or False label is been provided regarding whether the pair of elements match, or not.

10. The method of claim 1, wherein the parameters are estimated by means of gradient ascent on likelihood function.

11. The method of claim 1, wherein the parameters are estimated an expectation maximization algorithm.

12. The method of claim 1, wherein belief updating uses variable elimination.

13. The method of claim 1, wherein belief updating uses generalized belief propagation.

* * * * *